(12) United States Patent
Löffelholz et al.

(10) Patent No.: US 6,510,044 B1
(45) Date of Patent: Jan. 21, 2003

(54) PASTE FOR PRODUCING SINTERED REFRACTORY METAL LAYERS, NOTABLY EARTH ACID METAL ELECTROLYTIC CAPACITORS OR ANODES

(75) Inventors: Josua Löffelholz, Langelsheim (DE); Marianne Gottschling, Goslar (DE); Karsten Binner, Goslar (DE)

(73) Assignee: H. C. Starck GmbH & Co. KG, Goslar (DE)

( * ) Notice: Subject to any disclaimer, the term of this patent is extended or adjusted under 35 U.S.C. 154(b) by 0 days.

(21) Appl. No.: 09/786,651

(22) PCT Filed: Aug. 30, 1999

(86) PCT No.: PCT/EP99/06379
§ 371 (c)(1),
(2), (4) Date: Mar. 7, 2001

(87) PCT Pub. No.: WO00/16353
PCT Pub. Date: Mar. 23, 2000

(30) Foreign Application Priority Data

Sep. 10, 1998 (DE) .......................... 198 41 352
Jun. 18, 1999 (DE) .......................... 199 27 909

(51) Int. Cl.[7] ............................................. H01G 9/04
(52) U.S. Cl. ........................ 361/510; 361/511; 361/523; 361/528; 361/502
(58) Field of Search ........................ 361/510, 433, 361/528, 529, 503, 508, 523, 517, 512, 511, 519, 509; 29/25.03

(56) References Cited

U.S. PATENT DOCUMENTS

| | | | | |
|---|---|---|---|---|
| 3,818,286 A | * | 6/1974 | Ganz | |
| 4,090,288 A | * | 5/1978 | Thompson et al. | 29/570 |
| 4,288,842 A | * | 9/1981 | Voyles | 361/433 |
| 4,450,049 A | * | 5/1984 | Nakata et al. | 204/35 |
| 4,494,299 A | | 1/1985 | Franklin et al. | 29/570 |
| 4,517,626 A | * | 5/1985 | Allen et al. | |
| 4,522,737 A | * | 6/1985 | MacNamee | 252/62.2 |
| 4,731,111 A | * | 3/1988 | Kopatz et al. | 75/0.5 |
| 5,034,857 A | * | 7/1991 | Wong | |
| 5,349,496 A | * | 9/1994 | Taniguchi et al. | |
| 6,307,735 B1 | * | 10/2001 | Saito et al. | |

FOREIGN PATENT DOCUMENTS

DE 197 47 757 1/1999

* cited by examiner

Primary Examiner—Chau N. Nguyen
Assistant Examiner—Nguyen Ha
(74) Attorney, Agent, or Firm—Joseph C. Gil; Diderico van Eyl

(57) ABSTRACT

A paste is described for the production of sintered refractory metal layers, particularly for electrolytic capacitor anodes, consisting of 40 to 92% by weight of a refractory metal powder as a discrete phase, and of a continuous phase which substantially consists of organic compounds which are synthesised from carbon, oxygen and hydrogen only, wherein the ratio of the number of oxygen atoms to carbon atoms is at least 0.5, and optionally consisting of a solvent which evaporates below 150° C.

19 Claims, 2 Drawing Sheets

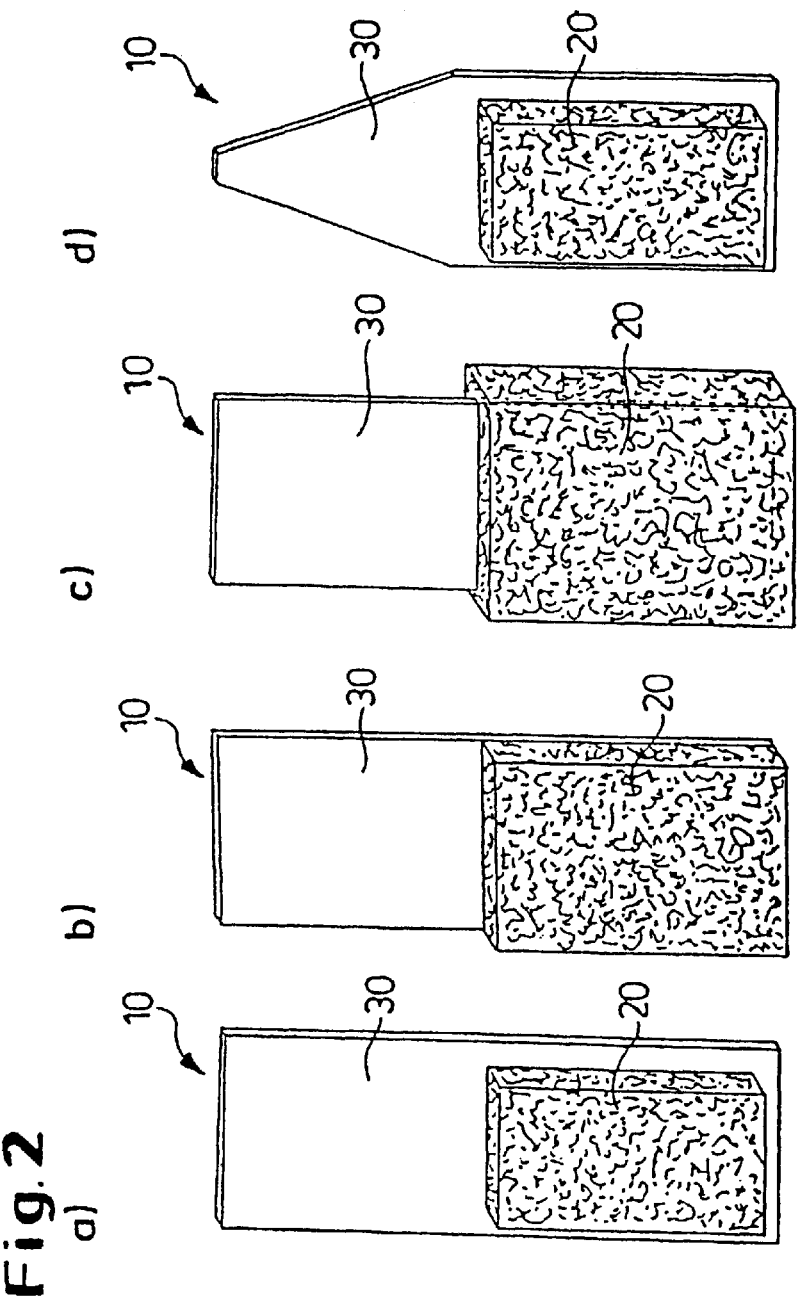
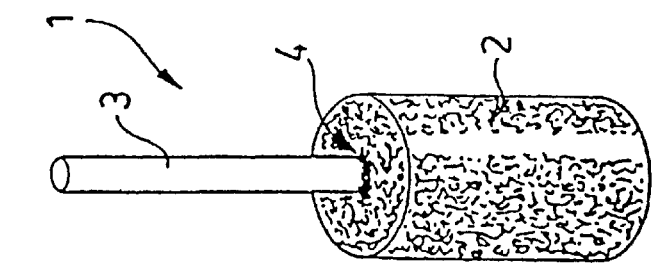

PASTE FOR PRODUCING SINTERED REFRACTORY METAL LAYERS, NOTABLY EARTH ACID METAL ELECTROLYTIC CAPACITORS OR ANODES

BACKGROUND OF THE INVENTION

The present invention relates to a paste for the production of sintered coatings of refractory metal powders, particularly for electrolytic capacitor electrodes made of tantalum, niobium or alloys thereof. The invention relates in particular to a process for the pressureless production of tantalum and/or niobium capacitor electrodes. The invention also relates in particular a process for the production of new types of electrodes and capacitors by means of pastes. The invention further relates to new types of capacitor electrodes comprising sheet-like supports.

Tantalum capacitors consist of a porous sintered layer of pre-agglomerated tantalum powder, which is coated with a layer of a dielectric insulator, namely an oxide layer, and which is deposited on a tantalum wire which serves firstly as an electrical contact and secondly as a support. The counterelectrode is formed by a liquid, paste-like or solid electrolyte. The high specific capacitance of capacitors of this type is due to the large surface area of dielectric which is provided by the porosity of the sintered layer. The sintered layer is produced by pressing and sintering the free-flowing powder. An analogous procedure is employed for the production of niobium capacitors.

It is first of all clear that the pressing procedure, comprising the insertion of the contact wire in the press mould, the introduction of the free-flowing powder into the gap between the contact wire and the press mould, the compaction of the powder, etc., is a costly procedure. Furthermore, this procedure only permits a limited range of shapes and dimensions to be fabricated.

On the other hand, paste deposition processes enable pressureless sintering to be effected, enable almost any shapes and dimensions to be produced corresponding to the capacitor design, and also enable thin, sheet-like anodes to be produced in particular.

One problem with the development of finer and finer acidic earth metal powders in order to achieve higher specific capacitances is the associated effect of the increasing current density in the sintered body in the surroundings of the supporting wire, which can result in overheating and in the spontaneous reaction of the $MnO_2$ counterelectrode with the sintered anode (burning away of the acidic earth metal powder). A sheet-like construction of the sintered body would result in a reduction in current density and would ensure better dissipation of heat.

Accordingly, a process which enables sintering to be effected after applying a paste to the contact wire or to a contact sheet would be associated with significant technical advantages at a considerably lower production costs. Despite the obvious advantages which a process such as this would offer, no proposals for a process such as this have hitherto become known or have been introduced into industry. The reason for this is that no pastes have hitherto become known which would satisfy the diverse and complex requirements of capacitor production. The problem to be solved consists of identifying a continuous phase for the paste, which at the same time does not affect the extremely sensitive surface of the tantalum or niobium powder, particularly before and during sintering, which can be removed from the sintered layer without leaving a residue, and which nevertheless provides the requisite rheological properties for the deposition of paste on the substrate, which imparts a satisfactory level of stability to the deposited paste-like layer, and which moreover can be removed from the tantalum powder layer without impairing the microstructure thereof.

Numerous investigations have shown that pastes comprising a continuous phase based on water or low-boiling organic solvents do not impart an adequate level of stability to the powder microstructure. At an elevated temperature, or even at room temperature, they dry with the formation of bubbles, and may even produce a foam. Inorganic or mineral rheology-modifying agents are ruled out due to contamination of the tantalum surface by inorganic residues. It is also necessary to avoid contamination by carbon which is formed from residues of organic constituents of the continuous phase.

It has now been found that pastes which result in a continuous phase which, optionally after the evaporation of a low-boiling solvent, substantially consists of organic substances which are synthesised from carbon, oxygen and hydrogen only, and in which the ratio of the number of oxygen atoms to carbon atoms is at least 0.5, preferably at least 2/3, more preferably at least 0.8 and most preferably 1, do not leave behind any troublesome carbon residues after sintering under high vacuum. Pastes of this type enable acidic earth metal capacitors to be produced in sheet form.

SUMMARY OF THE INVENTION

The present invention relates to anodes for electrolytic capacitors based on sintered acidic earth metal powders, consisting of a metallic support which is constructed as an electrical contact, and of a porous sintered body which constitutes the capacitor surface and which is attached to the support, wherein the supporting body is constructed in the form of a metal sheet.

The present invention also relates to electrolytic capacitors comprising a sintered acidic earth metal powder anode, which is of sheet-like construction, i.e. the geometric extent thereof in two dimensions is greater than the extent thereof in the third dimension.

The anodes according to the invention are preferably constructed so that the supporting metal sheet protrudes beyond the sintered body in at least one direction. This results in a further improvement in the dissipation of heat and in a simplification of the system of electrical contacts.

According to the invention, the supporting metal sheet, which preferably consists of Nb or Ta, can have a length to width ratio of 3:1 to 10:1 or more, wherein a partial surface area of 0.5 to 100 $mm^2$, preferably 2 to 40 $mm^2$, of the supporting metal sheet is provided on one or both sides with the sintered body.

The supporting metal sheet can have a thickness from 30 to 500 $\mu m$, preferably 40 to 300 $\mu m$, most preferably 60 to 150 $\mu m$. The sintered body which is sintered thereon can have a thickness from 20 to 2000 $\mu m$, preferably more than 100 $\mu m$, most preferably 300 to 1000 $\mu m$.

The present invention further relates to a process for the production of sintered refractory metal layers, consisting of 40 to 92% by weight of a refractory metal powder as a discrete phase, and of a continuous phase which substantially consists of organic compounds which are synthesised from carbon, oxygen and hydrogen only, wherein the ratio of the number of oxygen atoms to carbon atoms is at least 1/2, and optionally consisting of a solvent which evaporates below 100° C. The amount of refractory metal powder preferably ranges from 10 to 50% by volume of the paste.

Although the invention is described below using tantalum as an example, it can also be used correspondingly for niobium and other refractory metals such as molybdenum, tungsten and alloying metals.

Compounds which are liquid at room temperature are preferably used as the organic compounds. In this case, the remainder of the continuous phase is preferably free from solvent. Examples of suitable liquid organic compounds include ethylene glycol, diethylene glycol, tri- and tetraethylene glycol and esters thereof, glycerol, glycerol monoacetate, glycerol diacetate, glycerol triacetate, dioxyacetone, propanediol or mixtures thereof. Moreover, the continuous phase preferably contains an organic binder system in addition. The binder system preferably consists of two components which are capable of crosslinking with each other. The binder should be used in amounts of not more than 5% by weight with respect to the continuous phase. One preferred binder system consists of Natrosol® Plus 331 supplied by Hercules or of an acrylic polymer, for example Rohagit® KF720 supplied by Röhm. Wetting agents, such as soya lecithin supplied by Langer and/or Sulfinols as supplied by Biesterfeld for example, are preferably used to improve the wetting of the metal powder. Provided that the binder is only used in minor amounts, the ratio of oxygen atoms to carbon atoms in the continuous phase is substantially unaffected. The phosphorus and nitrogen which are introduced into the continuous phase by soya lecithin are harmless, since phosphorus and nitrogen are two of the customary dopants for tantalum powder which is used for capacitors.

The binder system is preferably adjusted so that the viscosity of the paste at a shear rate of $10^{-4}$/sec is between 20 and 200 kpas.

According to a further embodiment of the invention, the organic compound can also be a solid substance. Examples of suitable organic compounds which are solid at room temperature include erythritol, pentaerythritol, pentoses, aldoses or ketoses comprising 3 to 6 carbon atoms, or mixtures thereof. Sugars or compounds similar to sugars are also suitable. Solid organic compounds are used in combination with a solvent, wherein the solvent should evaporate at temperatures up to 150° C. Examples of suitable solvents include water, ethanol, propanol and short-chain glycols.

The aforementioned liquid organic compounds are also suitable as solvents provided that the solid organic compounds are sufficiently soluble therein. Solid organic compounds can accordingly be used as thickeners if liquid organic compounds are used as the main component of the continuous phase.

The present invention also relates to a process for the production of sintered refractory metal layers, which is characterised in that a paste according to the invention is deposited on a substrate, the solvent which is optionally present is removed at a temperature which is below the boiling temperature of the solvent, and the substrate is subsequently heated to the sintering temperature under high vacuum. It is essential that a low rate of heat-up, which is preferably less than 10 K/minute, is employed over the temperature range within which the organic compound decomposes. A rate of heat-up which is less than 3 K/minute is preferably employed over the temperature range from about 200 to about 400° C.

When solid organic compounds are used which are dissolved in a solvent, the paste which is deposited on the substrate is converted into a dry layer of powder (green structure) when the solvent is removed. The particles of powder in this dry layer of powder are bonded to each other by the solid organic compound used, and the layer structure is therefore stabilised.

It has also been shown that it is advantageous if the paste is held, optionally after removing the solvent, for a further period of time, preferably for about 10 to 30 minutes, at a temperature from 150 to 200° C. in an oxygen-containing atmosphere, preferably air. In the course of this holding period, the organic compounds which are used are obviously capable of absorbing or bonding additional oxygen, which has a favourable effect on the ability of said compounds to decompose without leaving a residue.

Niobium or tantalum sheet is preferably used as the substrate on which the refractory metal powder is deposited. The preferred refractory metal powders are niobium and/or tantalum powder agglomerates which are suitable for the production of capacitors. Tantalum or niobium foils with a thickness from 50 to 400 $\mu$m are particularly suitable as substrates for the production of capacitor electrodes.

The paste can be deposited on the substrate by screen printing, stencil printing, by doctor blade, by immersion or by extrusion.

One advantageous process for the production of tantalum or niobium capacitor anodes in sheet form consists of coating a substrate foil of relatively large area with the paste by means of stencil printing, using a stencil which comprises 100 to 1000 cut-outs corresponding to the desired electrode shape and area, for example 2 mm×1 mm, and cutting up the foil after sintering so that 100 to 1000 capacitor anodes can be produced from the foil.

The substrate foil is most preferably constructed in the form of a comb, on each of the tooth tips of which a sintered body is deposited. The back of the comb can then advantageously function as a system support for a multiplicity of anodes, for further processing to form capacitors.

The present invention also relates to the anode comb containing a multiplicity of anodes and consisting of a supporting metal sheet of comb-like construction, wherein each of the tooth tips of the comb comprises a sintered body made of an acidic earth metal powder.

The anode design according to the invention is explained in more detail below with reference to FIGS. 1 to 4.

DESCRIPTION OF THE DRAWING

FIG. 1 shows an anode produced by pressure sintering according to the prior art;

FIGS. 2*a* to *d* show various embodiments of anodes according to the invention;

DETAILED DESCRIPTION

Figure 3:
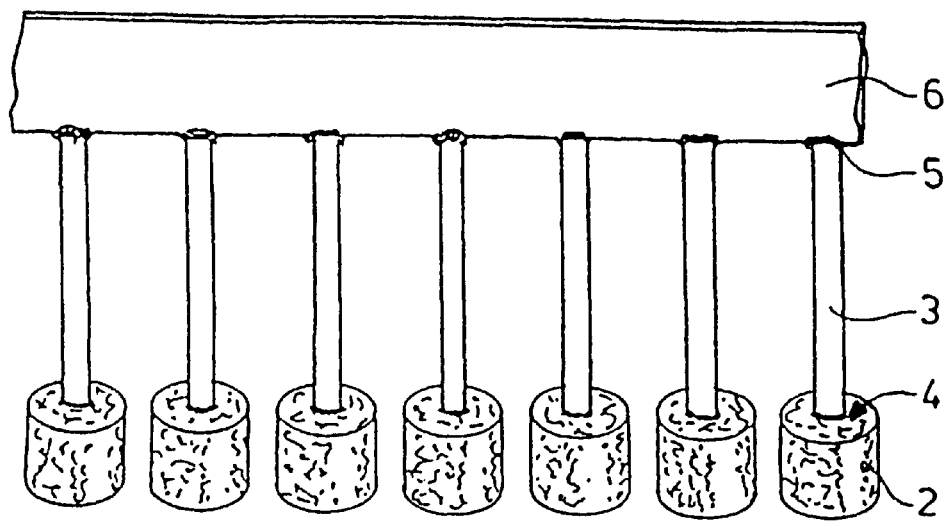
FIG. 3 shows an anode comb according to the prior art.

The prior art anode 1 which is shown in FIG. 1 consists of a sintered body 2, which has been produced by pressing and sintering a free-flowing powder which is introduced into a die. The lead wire 3 is welded to the sintered body 2 by means of a weld joint 4.

The anodes 10 according to the invention which are shown in FIG. 2 consist of a sintered body 20 which is produced by depositing paste on the supporting metal sheet 30, followed by drying and pressureless sintering. The supporting metal sheet 30 may protrude beyond the sheet-like sintered body 20 on all sides (a), or may protrude in one direction only (b), wherein a sintered body can also be provided on both sides of the support. Moreover, the sintered body (a deposit of paste formed by immersion, for example) may completely surround the end of the supporting metal sheet (c).

FIG. 2d shows a different form of the supporting metal sheet. In all cases, the part of the supporting metal sheet which protrudes beyond the sintered body performs the function of the lead wire (FIG. 1).

FIG. 3 shows an anode comb according to the prior art, wherein the sintered body 2 is attached to the system support sheet 6 via the lead wire 3, by means of weld joints 4 and 5.

Figure 4:
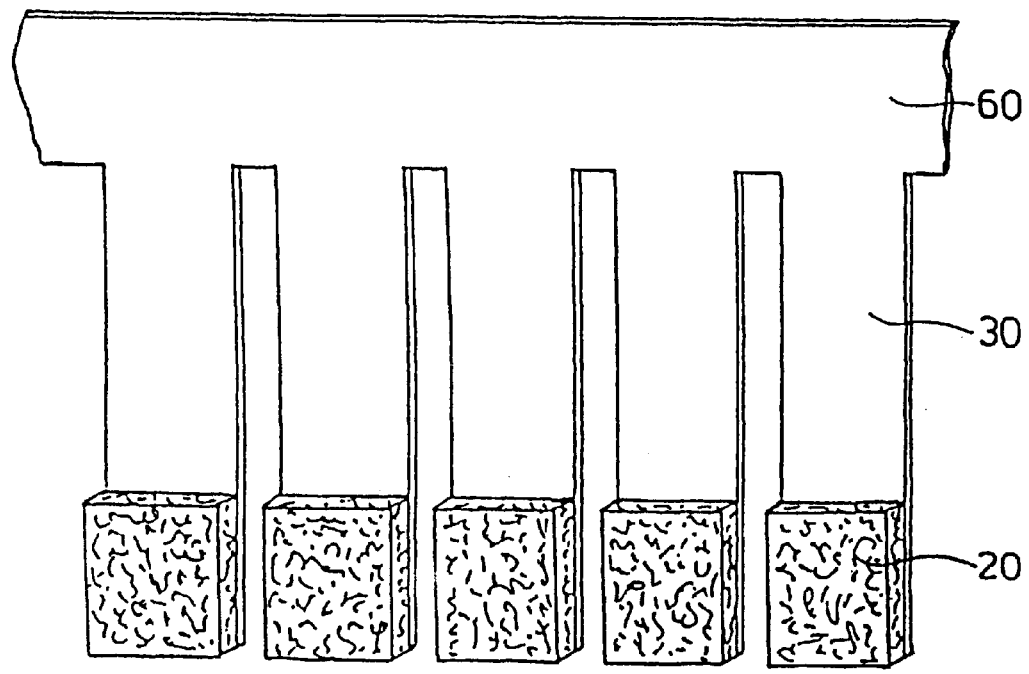
FIG. 4 shows an anode comb according to the invention.

In the anode comb according to the invention which is shown in FIG. 4, the weld joints 4 and 5 which are necessary according to the prior art are dispensed with, since the comb back 60, which forms the system support, and the teeth 30, the tips of which support the sintered bodies 20, have been formed from a piece of sheet metal before or after the deposition of the paste or after sintering.

The invention is further explained with reference to the following examples. All percentages are given as percentages by weight.

EXAMPLE 1

77.6% Ta powder, consisting of agglomerates of primary particles with an agglomerate distribution corresponding to $d_{10}=2$ μm, $d_{50}=5$ μm and $d_{90}=26$ μm as determined using a Mastersizer, with a visually determined average primary particle of about 300 μm, with a BET specific surface of 0.77 m²/g and with a bulk density of 23.60 g/inch³, was stirred with 21.4% glycerol, 0.2% Surfinol 420 (a mixture of ethoxylated ethine diols supplied by Air Products), 0.8% soya lecithin W250 supplied by Langer, and with 0.02% of Rohagit KF720 (a solid acrylic polymer supplied by Röhm), and the mixture was homogenised by means of a three-roller mill.

After a holding time of 24 hours, the viscosity was determined by means of a rheometer supplied by Bohlin Instruments (CP4°/20 correction measuring system). The viscosity at a shear rate of $10^{-4}$ sec$^{-1}$ was 28 kPas, at $10^{-2}$ sec$^{-1}$ it was 109 Pas, and at 10 sec$^{-1}$ it was 13 Pas (25° C.).

EXAMPLE 2

82.6% Ta powder, consisting of agglomerates of primary particles with an agglomerate distribution corresponding to $d_{10}=2$ μm, $d_{50}=5$ μm and $d_{90}=26$ μm as determined using a Mastersizer, with a visually determined average primary particle of about 300 μm, with a BET specific surface of 0.77 m²/g and with a bulk density of 23.60 g/inch³, was stirred with 16% tetraethylene glycol, 0.6% Natrosol Plus cellulose supplied by Hercules, 0.2% Surfinol 420 (a mixture of ethoxylated ethine diols supplied by Air Products), and with 0.6% soya lecithin W250 supplied by Langer, and the mixture was homogenised by means of a three-roller mill.

After a holding time of 24 hours, the viscosity was determined by means of a rheometer supplied by Bohlin Instruments (CP4°/20 correction measuring system).

The viscosity at a shear rate of $10^{-4}$ sec$^{-1}$ was 75 kpas, at $10^{-2}$ sec$^{-1}$ it was 2 kpas, and at 10 sec$^{-1}$ it was 5 Pas (25° C.).

EXAMPLE 3

Tantalum foil of thickness 150 μm, which had been washed with isopropyl alcohol, was used as a substrate. A stainless steel stencil with a thickness of 400 μm, which comprised 550 rectangular cut-outs of dimensions 1 mm times 2 mm, was placed on the Ta foil. A paste according to Example 2 was subsequently pressed into the cut-outs by means of a doctor blade. The Ta foil which was thus provided with printed structures was treated for 10 minutes in a circulating air oven. It was subsequently heated in a sintering furnace under high vacuum at a rate of 5 K/min up to 200° C., then at 2 K/min up to 400° C. and finally at 25 K/min up to 1300° C. After a further 30 minutes, the product was cooled to room temperature (<100° C.). The sintered density of the sintered structures was 4.2 g/cm³. The tantalum foil was cut between the sintered structures to form individual anode structures, and was subjected to forming at 40 V.

Electrical Testing

Electrical measurements were made on three of the anodes which were produced in this manner. The following results were obtained:

| Sample | Capacitance μFV/g | Leakage current nA/μFV |
|---|---|---|
| 1 | 43331 | 0.55 |
| 2 | 44857 | 0.56 |
| 3 | 44216 | 0.58 |

What is claimed is:
1. A process for making a capacitor anode comprising:
    (a) applying a paste to a supporting metal sheet, wherein the paste comprises (i) a discrete phase comprising from 40 to 92% by weight of a refractory metal powder and (ii) a continuous phase comprising organic compounds synthesized from only carbon, oxygen and hydrogen, the ratio of the number of oxygen atoms to carbon atoms being at least 0.5, wherein the continuous phase additionally contains a binder system in a quantity of up to 50% by weight based on the continuous phase, and (iii) optionally a solvent which evaporates at below 150° C., and
    (b) subjecting the metal sheet to pressureless sintering, and thereby forming a capacitor anode comprising sintered acidic earth metal powders, wherein the anode further comprises (1) a metallic support, an electrical contact in the form of a metal sheet, and (2) a porous sintered body, attached to the support, wherein the porous sintered body forms a capacitor surface.
2. The process according to claim 1, wherein the paste includes a solvent having a boiling point and the process further comprises (i) removing the solvent at a temperature below the boiling point of the solvent and (ii) heating the supporting metal sheet to the sintering temperature in a high vacuum, wherein the heating is carried out at a temperature ranging from about 200 to about 400° C. at a heating rate of less than 3K/min.
3. The process according to claim 2, wherein, after removing the solvent, the metal sheet coated with the paste is treated at a temperature ranging from 150 to 200° C. in an oxygen-containing atmosphere.
4. The process according claim 1, wherein the metal sheet is a niobium or a tantalum metal sheet and the refractory metal powder is niobium and/or tantalum powder agglomerates which are suitable for the production of capacitors.
5. The process according to claim 1, wherein the paste is applied to the metal sheet in the form of surface structures by doctor-blade coating with a stencil.
6. A capacitor anode comprising sintered acidic earth metal powders, wherein the anode further comprises (1) a metallic support, an electrical contact in the form of a metal sheet, and (2) a porous sintered body, attached to the support, wherein the porous sintered body forms a capacitor surface, wherein the capacitor anode is made by a process comprising:
        (a) applying a paste to a supporting metal sheet, wherein the paste comprises (i) a discrete phase comprising from 40 to 92% by weight of a refractory metal powder and (ii) a continuous phase comprising organic compounds synthesized from only carbon, oxygen and hydrogen, the ratio of the number of oxygen atoms to carbon atoms being at least 0.5, wherein the continuous phase additionally contains a binder system in a quantity of up to 50% by weight based on the continuous phase, and (iii) optionally a solvent which evaporates at below 150° C., and
        (b) subjecting the metal sheet to pressureless sintering, and thereby forming the capacitor anode.

7. The anode of claim 6, wherein in the process, the solvent is present in the paste and the solvent is removed at a temperature below the boiling point of the solvent and the metal sheet is then heated to the sintering temperature in a high vacuum, wherein the heating is carried out at a temperature ranging from about 200 to about 400° C. at a heating rate of less than 3K/min.

8. The anode according to claim 6, wherein, after removing the solvent, the metal sheet coated with the paste is treated at a temperature ranging from 150 to 200° C. in an oxygen-containing atmosphere.

9. The anode according claim 6, wherein the metal sheet is a niobium or a tantalum metal sheet and the refractory metal powder is niobium and/or tantalum powder agglomerates which are suitable for the production of capacitors.

10. The anode according to claim 6, wherein the paste is applied to the metal sheet in the form of surface structures by doctor-blade coating with a stencil.

11. The anode according to claim 6, wherein the metal sheet projects beyond the sintered body in at least one direction.

12. An anode comb comprising a plurality of capacitor anodes that are connected via a common electrical contact and are based on sintered acidic earth metal powders and sintered bodies, the common electrical contact being in the form of a comb-like metal sheet and the sintered bodies forming the capacitor electrode surface being sintered onto the teeth of the comb, wherein at least one anode is made by a process comprising:
    (a) applying a paste to a supporting metal sheet, wherein the paste comprises (i) a discrete phase comprising from 40 to 92% by weight of a refractory metal powder and (ii) a continuous phase comprising organic compounds synthesized from only carbon, oxygen and hydrogen, the ratio of the number of oxygen atoms to carbon atoms being at least 0.5, wherein the continuous phase additionally contains a binder system in a quantity of up to 50% by weight based on the continuous phase, and (iii) optionally a solvent which evaporates at below 150° C., and
    (b) subjecting the metal sheet to pressureless sintering, and thereby forming an anode for an electrolytic capacitor having a capacitor surface, and thereby forming a capacitor anode comprising sintered acidic earth metal powders, wherein the anode further comprises (1) a metallic support, an electrical contact in the form of a metal sheet, and (2) a porous sintered body, attached to the support, wherein the porous sintered body forms a capacitor surface.

13. The anode comb of claim 12, wherein the metal sheet or tooth of at least one anode has a cross-sectional ratio of at least 1:5.

14. The anode comb according to claim 12, wherein the metal sheet of at least one anode has a thickness ranging from 30 to 500 µm.

15. The anode comb of claim 12, wherein the metal sheet of at least one anode has a thickness ranging from 40 to 300 µm.

16. The anode comb according to claim 12, wherein the porous sintered body of at least one anode covers an area ranging from 0.5 to 100 mm².

17. The anode comb according to claim 12, wherein the porous sintered body of at least one anode covers from 2 to 40 mm² of the supporting metal sheet.

18. The anode comb according to claim 12, wherein the sintered body of at least one anode has a thickness ranging from 0.1 to 2 mm.

19. The anode comb according to claim 12, wherein the sintered body of at least one anode has a thickness ranging from 0.3 to 1 mm.

\* \* \* \* \*